(12) United States Patent
Watanabe et al.

(10) Patent No.: US 11,588,257 B2
(45) Date of Patent: Feb. 21, 2023

(54) TERMINAL AND CONNECTOR

(71) Applicant: Yazaki Corporation, Tokyo (JP)

(72) Inventors: Kazuma Watanabe, Kakegawa (JP);
Yasuhiro Yamaguchi, Kakegawa (JP);
Hiroyuki Tanaka, Kakegawa (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 17/541,915

(22) Filed: Dec. 3, 2021

(65) Prior Publication Data
US 2022/0181798 A1 Jun. 9, 2022

(30) Foreign Application Priority Data
Dec. 4, 2020 (JP) .............................. JP2020-202056

(51) Int. Cl.
*H01R 4/28* (2006.01)
*H01R 4/48* (2006.01)

(52) U.S. Cl.
CPC .................................. *H01R 4/4863* (2013.01)

(58) Field of Classification Search
CPC ...... H01R 4/4863; H01R 4/4854; H01R 4/28; H01R 4/489; H01R 4/52
USPC ......................................................... 439/863
See application file for complete search history.

(56) References Cited

U.S. PATENT DOCUMENTS

| | | | |
|---|---|---|---|
| 6,439,894 B1* | 8/2002 | Li | H01R 13/2492 439/840 |
| 8,057,270 B2* | 11/2011 | Shimazu | H01R 13/17 439/827 |
| 8,753,153 B2* | 6/2014 | Leon | B21F 35/00 439/840 |
| 9,306,307 B2* | 4/2016 | Starke | B21F 11/005 |
| 10,305,214 B2* | 5/2019 | Kimura | H01R 13/2421 |
| 2018/0375242 A1* | 12/2018 | Nishida | H01R 11/12 |

FOREIGN PATENT DOCUMENTS

JP 2018-014168 A 1/2018

* cited by examiner

*Primary Examiner* — Harshad C Patel
(74) *Attorney, Agent, or Firm* — Banner & Witcoff, Ltd.

(57) ABSTRACT

A terminal is to be connected to a mating terminal having a flat surface portion. The terminal includes a conductive main body having an abutment surface, an annular terminal spring, the annular terminal spring being held on the abutment surface and a fastener holding the annular terminal spring on the abutment surface. The fastener includes a main body shaft being inserted into a central space of the annular terminal spring, a first end of the main body shaft being fixed to the conductive main body, and a plurality of arm portions extending outward in a radial direction of the fastener from a second end of the main body shaft, the second end being opposite to the first end, the plurality of arm portions being configured to hold the annular terminal spring at a contacting portion of the annular terminal spring, the contacting portion contacting the abutment surface.

6 Claims, 9 Drawing Sheets

TERMINAL AND CONNECTOR

CROSS-REFERENCE TO RELATED APPLICATION

The present application claims priority to Japanese Patent Application No. 2020-202056 filed on Dec. 4, 2020, the entire content of which is incorporated herein by reference.

TECHNICAL FIELD

The present invention relates to a terminal and a connector.

BACKGROUND

A related art terminal is brought close to the mating terminal to compress an annular spring (annular terminal spring) formed in an annular shape by joining both end portions of a coil spring, and is electrically connected to the mating terminal via the annular spring (see, for example, JP2018-14168A). In the terminal, an inner peripheral portion of the annular spring is held on the terminal by means of a holding shaft portion inserted into a space (central space) annularly surrounded by the annular spring.

In the terminal having the above structure, when the annular spring is compressed by bringing the terminal toward the mating terminal, the holding shaft portion protrudes from the inner peripheral portion of the annular spring. For this reason, in order to avoid interference with the holding shaft portion protruding from the annular spring, it is necessary to perform hole machining for forming an escape hole into which the holding shaft portion is inserted in the mating terminal, which leads to an increase in cost. In addition, when the terminal and the mating terminal are to be brought to electrically connected to each other, if the terminal and the mating terminal are displaced from each other in a direction intersecting the connecting direction along which the terminal and the mating terminal are brought toward each other, the holding shaft portion may interfere with the mating terminal without being inserted into the escape hole, and a connection failure may occur.

SUMMARY

Illustrative aspects of the present invention provide a terminal configured to be easily connected to a mating terminal to obtain high connection reliability while reducing the cost, and a connector.

According to an illustrative aspect of the present invention, a terminal is configured to be connected to a mating terminal having a flat surface portion. The terminal includes a conductive main body having an abutment surface configured to face the flat surface portion, an annular terminal spring in which a spring having conductivity is bent and both ends of the spring are joined to each other such that the spring has an annular shape, the annular terminal spring being held on the abutment surface and a fastener holding the annular terminal spring on the abutment surface. The fastener includes a main body shaft being inserted into a central space of the annular terminal spring, a first end of the main body shaft being fixed to the conductive main body, and a plurality of arm portions extending outward in a radial direction of the fastener from a second end of the main body shaft, the second end being opposite to the first end, the plurality of arm portions being configured to hold the annular terminal spring at a contacting portion of the annular terminal spring, the contacting portion contacting the abutment surface.

According to another illustrative aspect of the present invention, a connector includes a mating terminal having a flat surface portion and the terminal. The mating terminal and the terminal are configured to electrically connected to each other with the annular terminal spring being compressed along an insertion direction in which the main body shaft is inserted into the central space of the annular terminal spring by the conductive main body and the mating terminal.

Other aspects and advantages of the invention will be apparent from the following description, the drawings and the claims.

DESCRIPTION OF EMBODIMENTS

Figure 1:
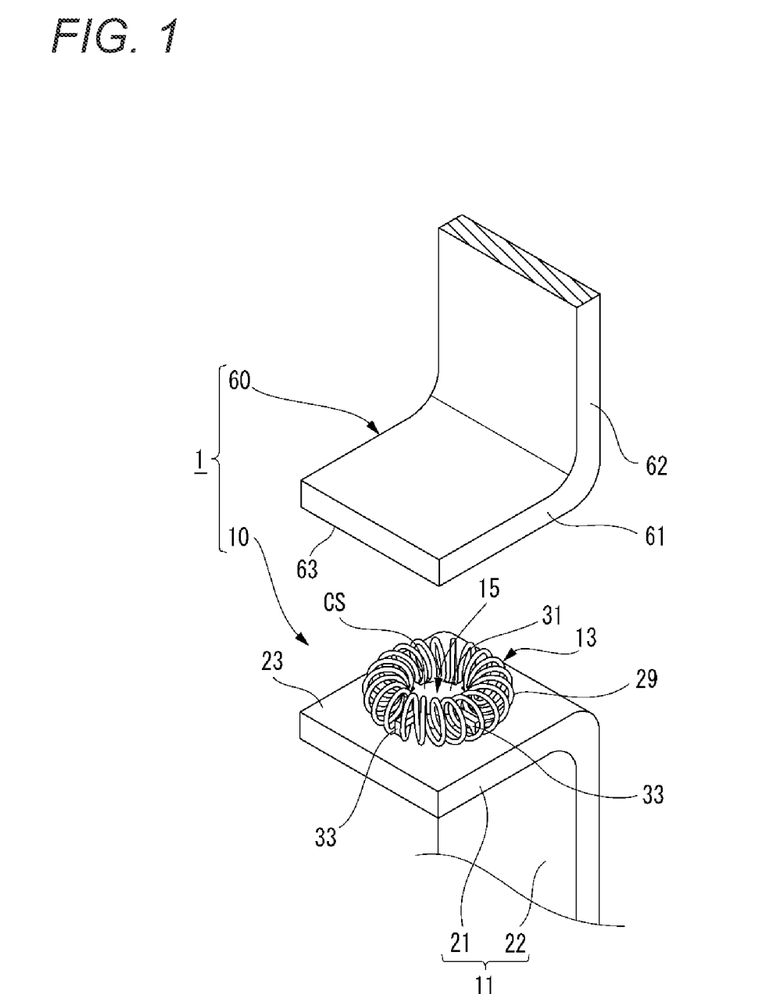
FIG. 1 is a perspective view of a connector including a terminal according to an embodiment of the present invention.

Hereinafter, embodiments according to the present invention will be described with reference to the drawings. FIG. 1 is a perspective view of a connector 1 including a terminal 10 according to an embodiment of the present invention. As shown in FIG. 1, the terminal 10 according to the embodiment forms the connector 1 together with a mating terminal 60. In the connector 1, the terminal 10 and the mating terminal 60 are to be accommodated in housings (not shown), respectively. Then, these housings are engaged with each other, and the terminal 10 and the mating terminal 60 are abutted against each other, so as to be electrically connected to each other. Further, when the housings are disengaged from each other and the terminal 10 and the mating terminal 60 are separated from each other, the electrical connection is released.

The mating terminal 60 is formed of a conductive metal material. The mating terminal 60 is a conductor formed in an L-shape in a side view having a pressing plate portion 61 and a mating connection portion 62. A surface of the pressing plate portion 61 on a side to be abutted against the terminal 10 serves as a flat surface portion 63. The mating connection portion 62 is to be connected to another conductive member such as a bus bar, and is provided with a bolt hole (not shown) or the like.

Figure 2:
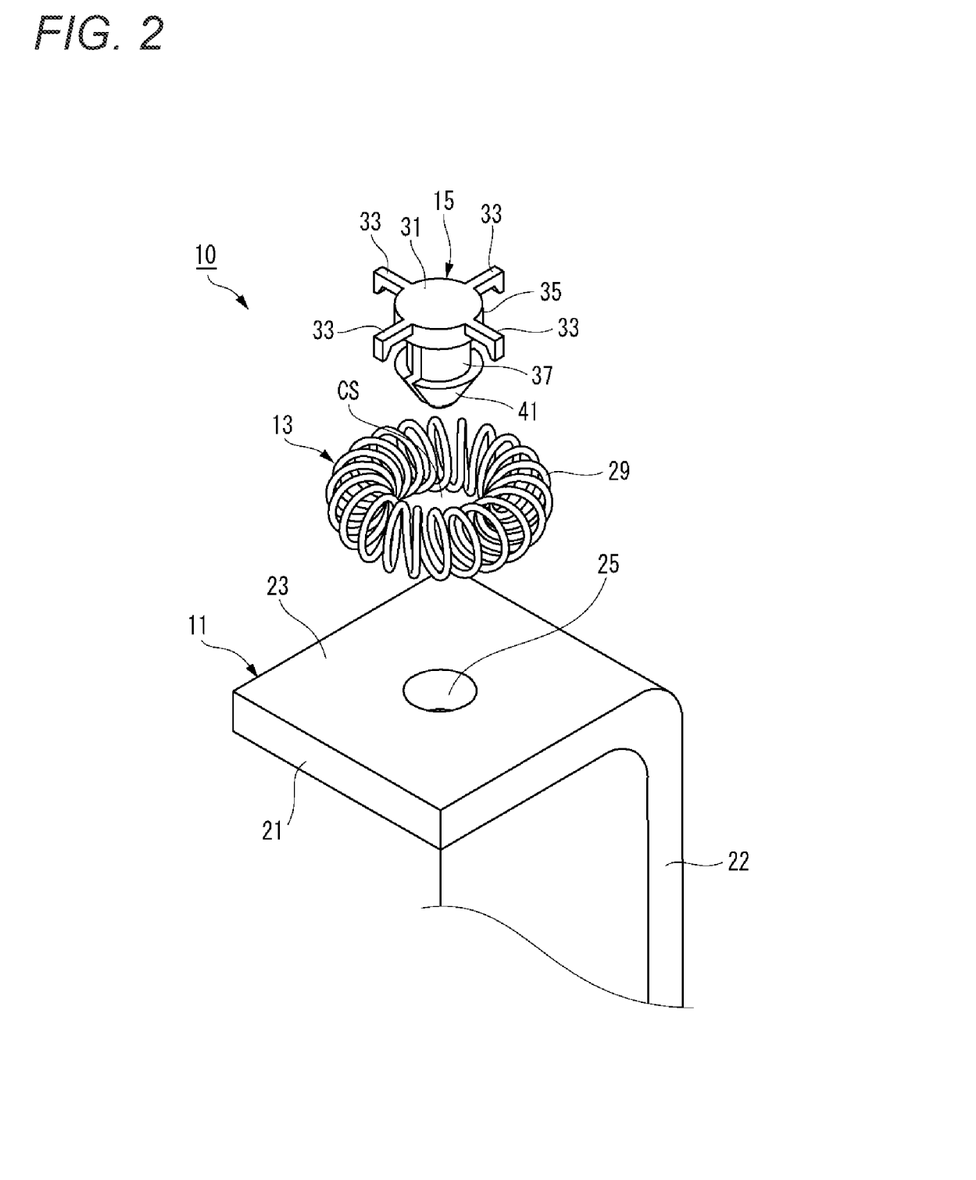
FIG. 2 is an exploded perspective view of the terminal according to the embodiment.
Figure 3:
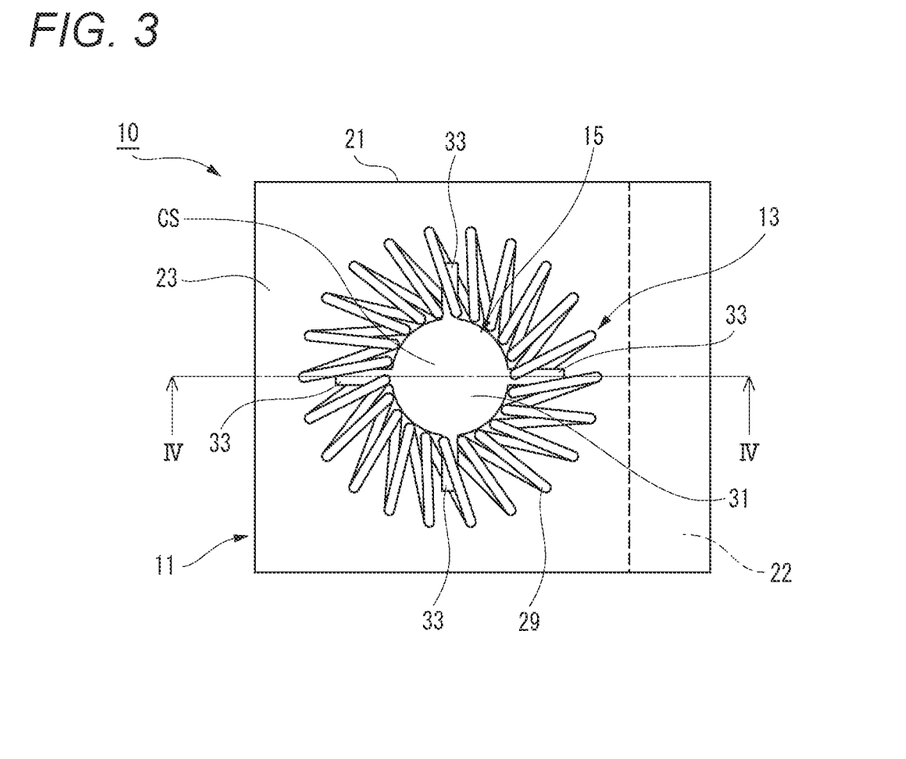
FIG. 3 is a plan view of the terminal according to the embodiment.
Figure 4:
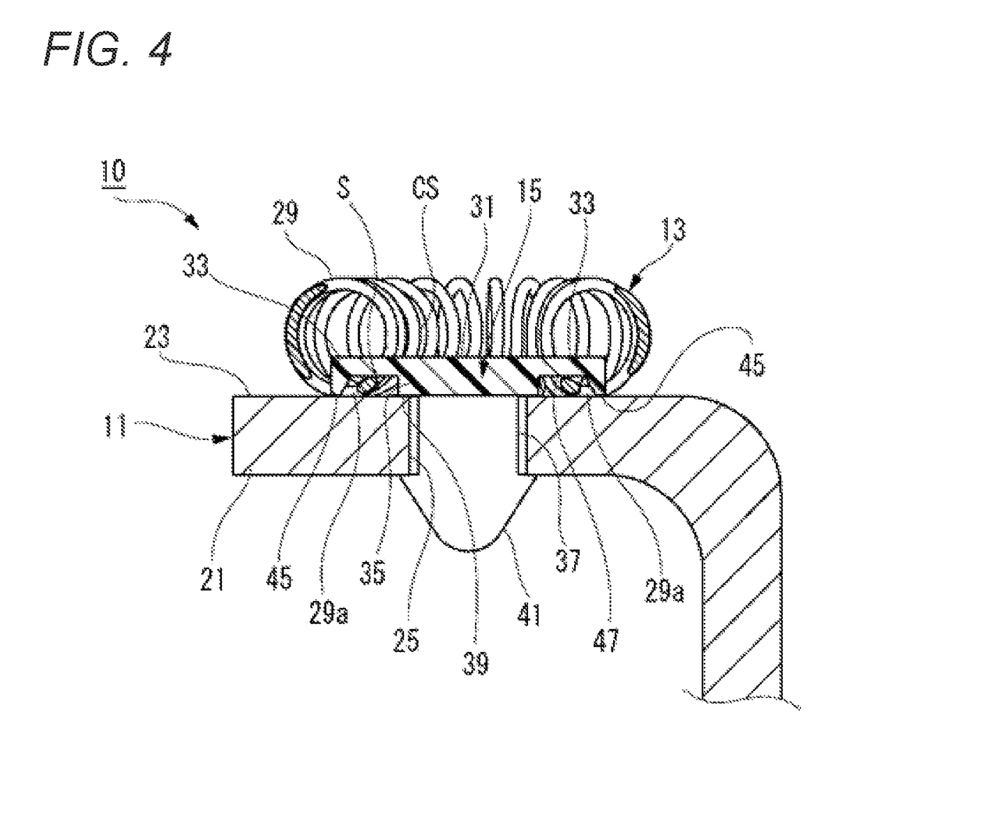
FIG. 4 is a cross-sectional view taken along a line IV-IV in FIG. 3.
Figure 5:
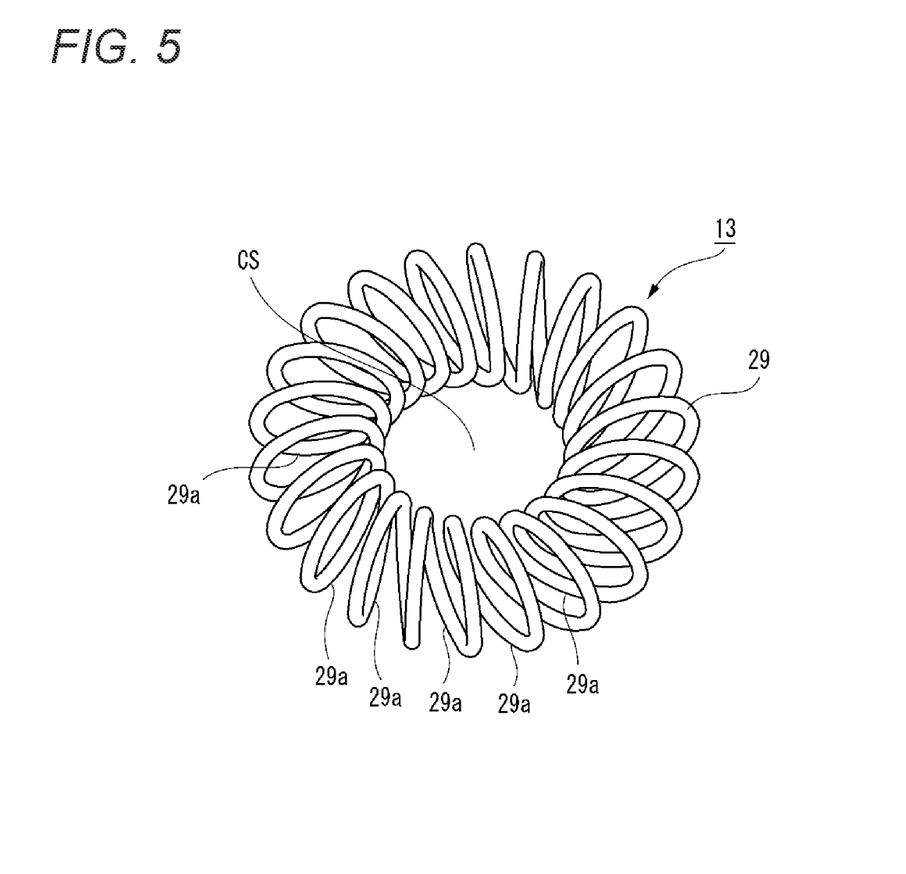
FIG. 5 is a perspective view of an annular terminal spring of the terminal.
Figure 6:
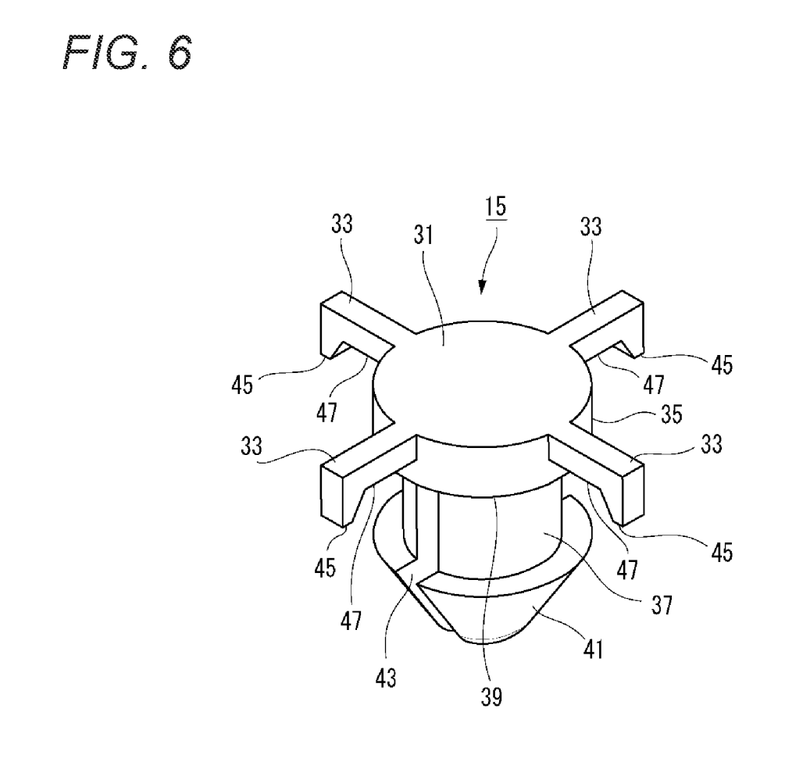
FIG. 6 is a perspective view of a fastener of the terminal.

FIG. 2 is an exploded perspective view of the terminal 10 according to the embodiment. FIG. 3 is a plan view of the terminal 10 according to the embodiment. FIG. 4 is a cross-sectional view taken along a line IV-IV in FIG. 3. FIG. 5 is a perspective view of an annular terminal spring 13 of the terminal 10. FIG. 6 is a perspective view of a fastener 15 of the terminal 10.

As shown in FIGS. 2 to 4, the terminal 10 includes a conductive main body 11, the annular terminal spring 13, and the fastener 15. The conductive main body 11 is formed of a conductive metal material. The conductive main body 11 is a conductive body formed in an L-shape in a side view having a connection plate portion 21 and a connection portion 22. A surface of the connection plate portion 21 on a side to be abutted against the mating terminal 60 serves as an abutment surface 23. A through hole 25 is formed in the connection plate portion 21 having the abutment surface 23. The through hole 25 runs through the connection plate portion 21 from the front to the back. The connection portion 22 is to be connected to another conductive member such as a bus bar, and is provided with a bolt hole (not shown) or the like.

As shown in FIG. 5, the annular terminal spring 13 is formed in an annular shape. The annular terminal spring 13 is formed of a coil spring formed by spirally winding a metal wire material having conductivity and elasticity such as spring steel, and both end portions of the coil spring are joined to each other by bending the coil spring into an annular shape. The annular terminal spring 13 is arranged and held on the abutment surface 23 of the conductive main body 11.

As shown in FIG. 6, the fastener 15 has a main body shaft 31 and a plurality of arm portions 33 extending outward in a radial direction from a rear end portion of the main body shaft 31. The fastener 15 is formed of an insulating synthetic resin, and holds the annular terminal spring 13 by being inserted into a central space CS of the annular terminal spring 13 disposed on the abutment surface 23 of the conductive main body 11 and a tip end portion of the fastener 15 being fixed to the conductive main body 11.

The main body shaft 31 includes a fixed plate portion 35 and a fixed shaft portion 37, and the fixed shaft portion 37 is formed integrally with the fixed plate portion 35. The fixed plate portion 35 is formed in a disk shape, and has an outer diameter smaller than an inner diameter of the annular terminal spring 13 and larger than a through hole 25 formed in the connection plate portion 21 of the conductive main body 11. The fixed shaft portion 37 is formed in a rod shape having a diameter smaller than that of the fixed plate portion 35, and can be inserted into the through hole 25. Therefore, the main body shaft 31 has a step portion 39 between the fixed plate portion 35 and the fixed shaft portion 37.

The fixed shaft portion 37 protrudes from the fixed plate portion 35 in an insertion direction in which the fixed shaft portion 37 is inserted into the central space CS of the annular terminal spring 13. A locking portion 41 having an outer diameter larger than an inner diameter of the through hole 25 is provided at a tip end portion of the fixed shaft portion 37. The locking portion 41 is formed in a tapered shape that gradually narrows toward the tip end. In other words, an outer diameter of the locking portion 41 gradually becomes smaller toward the tip end. A slit 43 passing through a central axis of the fixed shaft portion 37 along the axial direction of the fixed shaft portion 37 is formed in the fixed shaft portion 37 having the locking portion 41 at the tip end portion, so that the fixed shaft portion 37 is partially split along the axial direction.

A plurality of (four, in the present embodiment) arm portions 33 are provided, and each of the arm portions 33 is integrally molded with the fixed plate portion 35 of the main body shaft 31. The arm portions 33 extend outward in the radial direction of the main body shaft 31 from the fixed plate portion 35 formed at the rear end portion of the main body shaft 31, and are arranged at equal intervals in a circumferential direction of the main body shaft 31. Since the fastener 15 is formed of a synthetic resin, the arm portions 33 have flexibility. In addition, the arm portions 33 each have a locking protrusion 45 protruding in a direction toward the abutment surface 23 and provided at a tip end of the arm portion 33. Therefore, the arm portions 33 each have a recessed portion 47 on a side facing the abutment surface 23 between the locking protrusions 45 and the step portion 39 of the main body shaft 31.

Next, how the annular terminal spring 13 is held on the conductive main body 11 by the fastener 15 will be described. First, the annular terminal spring 13 is placed on the abutment surface 23 of the conductive main body 11. Next, the fastener 15 is inserted into the central space CS of the annular terminal spring 13 with the fixed shaft portion 37 of the main body shaft 31 facing the conductive main body 11.

Then, the fixed shaft portion 37 of the fastener 15 is inserted into the through hole 25 of the connection plate portion 21 of the conductive main body 11. At this time, since the fixed shaft portion 37 is partially split, the fixed shaft portion 37 gets elastically deformed inward and the locking portion 41 goes through the through hole 25. When the locking portion 41 comes out of the through hole 25, the locking portion 41 gets restored. As a result, the locking portion 41 locks an edge portion of the through hole 25 and so the fastener 15 gets fixed to the connection plate portion 21 of the conductive main body 11 with the step portion 39 of the fixed plate portion 35 abutting against the abutment surface 23 (see FIG. 4).

In this fixed state, each arm portion 33 of the fastener 15 is bent by the locking protrusion 45 abutting against the abutment surface 23, and locks and holds contacting portions 29a of a ring portion 29 contacting the abutment surface 23 of the annular terminal spring 13 in the bent state.

In addition, in a state where the annular terminal spring 13 is held, a space S is defined by the recessed portions 47 of the arm portions 33 and the abutment surface 23 between the arm portions 33 and the abutment surface 23, and the contacting portions 29a of the ring portion 29 of the annular terminal spring 13 are passed through the space S.

Figure 7:
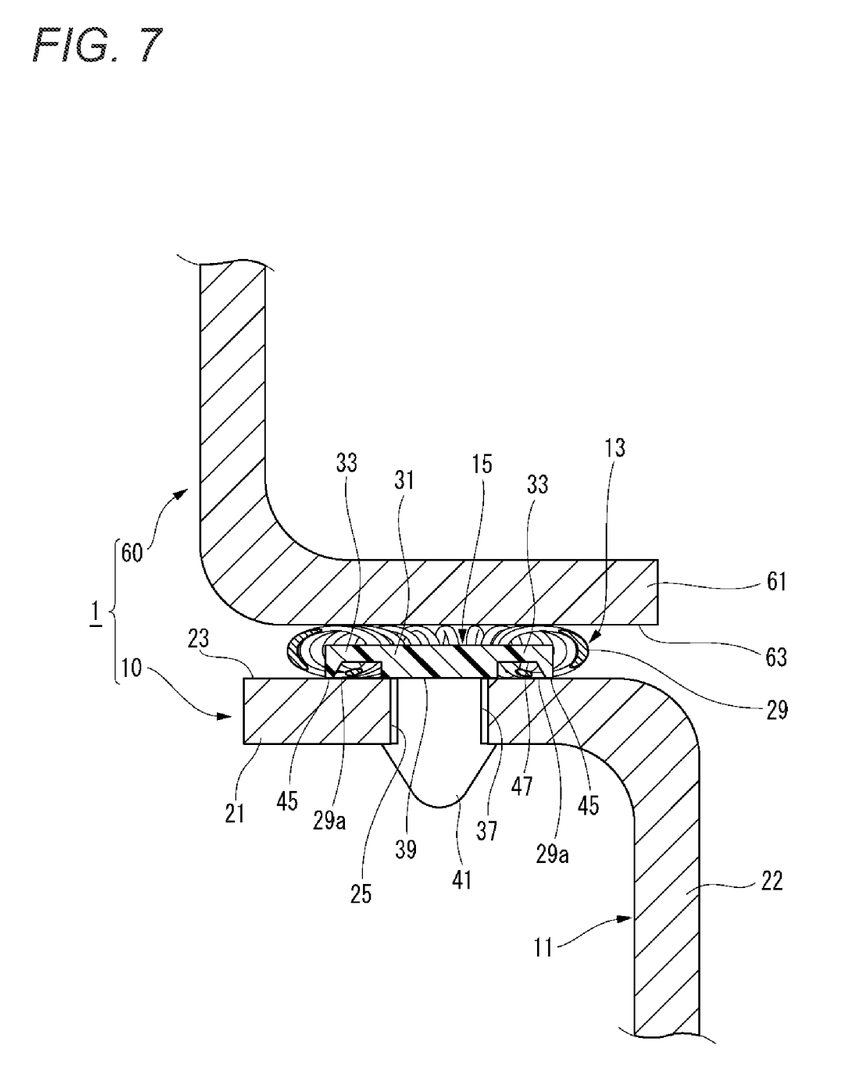
FIG. 7 is a longitudinal sectional view showing a connection state of the connector including the terminal according to the embodiment.

FIG. 7 is a longitudinal sectional view showing a connection state of the connector 1 including the terminal 10 according to the embodiment. As described above, when the mating terminal 60 is abutted against the terminal 10 in which the annular terminal spring 13 is held on the conductive main body 11, the flat surface portion 63 of the mating terminal 60 is brought into contact with the annular terminal spring 13 of the terminal 10. Then, as shown in FIG. 7, the annular terminal spring 13 is elastically deformed by being pressed by a pressing force applied in the axial direction of the connector 1, and elastically contacts the abutment surface 23 of the conductive main body 11 and the flat surface portion 63 of the pressing plate portion 61 of the mating terminal 60. That is, the mating terminal 60 and the terminal 10 get electrically connected to each other in a state where the annular terminal spring 13 is compressed along an insertion direction of the main body shaft 31 of the fastener 15 by the conductive main body 11 and the mating terminal 60.

At this time, since the contacting portions 29a of the ring portion 29 pass through the space S between the arm portions 33 and the abutment surface 23, the annular terminal spring 13 is configured such that portions of the annular terminal spring 13 held by the arm portions 33 of the fastener 15 are movable. Therefore, when the annular terminal spring 13 is compressed by the conductive main body 11 of the terminal 10 and the mating terminal 60, the portions of the contacting portions 29a of the annular terminal spring 13 which are held by the arm portions 33 are not unmovably fixed but can move. Therefore, when the annular terminal spring 13 is compressed, the ring portion 29 can easily lie down. As a result, the annular terminal spring 13 is brought into contact with the flat surface portion 63 of the pressing plate portion 61 of the mating terminal 60 in the circumferential direction of the annular terminal spring 13 in a uniform manner.

As described above, according to the terminal 10 of the embodiment, the contacting portions 29a of the annular terminal spring 13 contacting the abutment surface 23 is held by the plurality of arm portions 33 of the fastener 15 fixed to the conductive main body 11. That is, when the annular terminal spring 13 is compressed by the mating terminal 60, the main body shaft 31, in which the plurality of arm portions 33 holding the contacting portions 29a contacting the abutment surface 23 of the annular terminal spring 13 extend outward in the radial direction from the rear end portion of the main body shaft 31, does not protrude from the central space CS (inner peripheral portion) of the annular terminal spring 13. Therefore, when the terminal 10 and the mating terminal 60 are brought close to each other to be connected to each other, only the annular terminal spring 13 can be brought into contact with the flat surface portion 63 of the mating terminal 60. As a result, compared to a structure in the related art in which the holding shaft portion holding the annular terminal spring at the time of connection is inserted into the escape hole of the mating terminal, with the present embodiment, it is unnecessary to perform machining of the escape hole, and displacement of the terminal and the mating terminal in the direction intersecting the connecting direction of the terminal and the mating terminal can be allowed. Therefore, the terminal 10 according to the embodiment can be easily connected to the mating terminal 60 to obtain high connection reliability while reducing the cost.

According to the connector 1 including the terminal 10 of the embodiment and the mating terminal 60, as shown in FIG. 7, the annular terminal spring 13 is compressed by the flat surface portion 63 of the mating terminal 60 and the abutment surface 23 of the terminal 10, so that the terminal 10 and the mating terminal 60 can be electrically connected while easily absorbing the tolerance occurred in the connecting direction of the terminal 10 and the mating terminal 60 and the direction intersecting the connecting direction.

Further, according to the terminal 10 of the embodiment, the arm portions 33 having flexibility of the fastener 15 can hold the contacting portions 29a of the annular terminal spring 13 while being bent. Therefore, the annular terminal spring 13 can be satisfactorily held without rattling.

In addition, in the terminal 10 according to the embodiment, the contacting portions 29a of the ring portion 29 of the annular terminal spring 13 contacting the abutment surface 23 are passed through the space S defined between the arm portions 33 and the abutment surface 23 by the step portion 39 of the fastener 15. Therefore, when the annular terminal spring 13 is compressed at the time of connection between the terminal 10 and the mating terminal 60, the portions of the contacting portions 29a of the annular terminal spring 13 which are held by the arm portions 33 are not unmovably fixed but can move. Therefore, when the annular terminal spring 13 is compressed, the ring portion 29 can easily lie down. As a result, the annular terminal spring 13 can be brought into contact with the flat surface portion 63 of the mating terminal 60 in the circumferential direction in a uniform manner, and a good conduction state can be obtained.

Further, in the terminal 10 according to the embodiment, the arm portions 33 each have the locking protrusion 45 protruding toward the abutment surface 23. Accordingly, the movement of the contacting portions 29a of the annular terminal spring 13 held by the arm portions 33 along the abutment surface 23 can be limited by the locking protrusions 45, and the annular terminal spring 13 can be held more favorably.

Figure 8A:
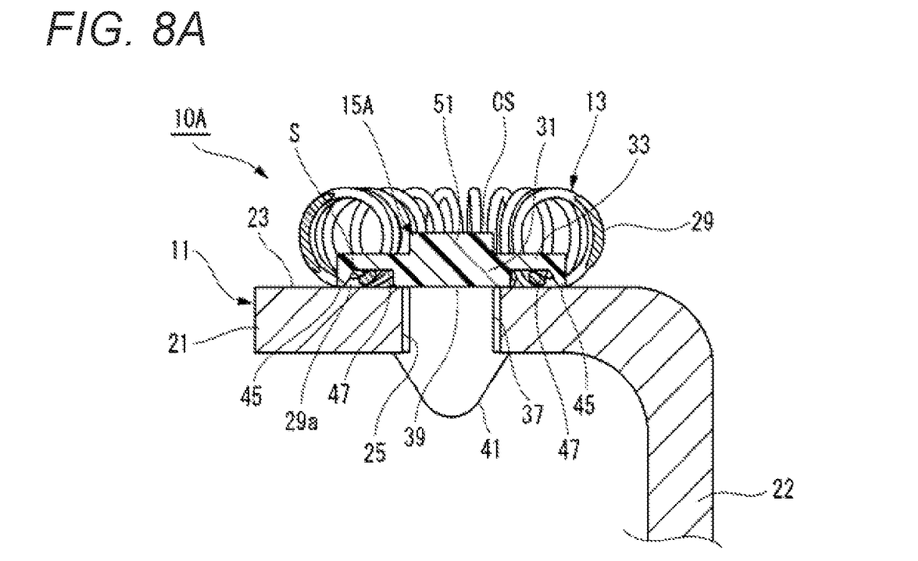
FIG. 8A is a cross-sectional view taken along an axial direction of a terminal according to another embodiment of the present invention.
Figure 8B:
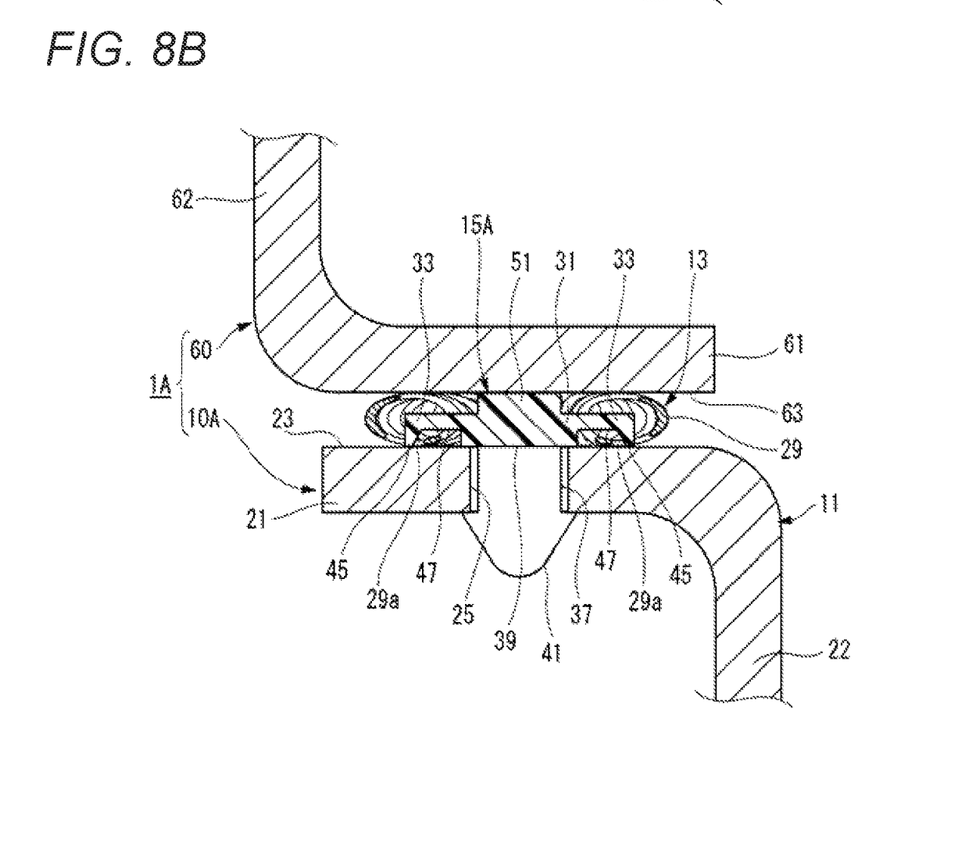
FIG. 8B is a cross-sectional view of a connector in which the terminal is in a connection state with a mating terminal.

FIG. 8A is a cross-sectional view taken along an axial direction of a terminal 10A according to another embodiment of the present invention, and FIG. 8B is a cross-sectional view of a connector 1A in which the terminal 10A is in a connection state with the mating terminal 60. Note that structural members in the another embodiment that are similar to those in the embodiment described above are appended with the same reference numerals, and detailed explanation thereof is omitted.

As shown in FIG. 8A, in the terminal 10A according to the another embodiment, a fastener 15A having a restricting protrusion 51 is used. The restricting protrusion 51 is provided on the main body shaft 31. The restricting protrusion 51 is formed at the rear end portion of the main body shaft 31, the rear end portion being on a side opposite to another side of the main body shaft 31 on which the locking portion 41 is provided. The restricting protrusion 51 forms a predetermined gap between the flat surface portion 63 and the abutment surface 23 of the terminal 10A by abutting against the flat surface portion 63 of the pressing plate portion 61. When the annular terminal spring 13 is held on the abutment surface 23 of the conductive main body 11 by the fastener 15A, an end surface (upper end surface in FIGS. 8A and 8B) of the restricting protrusion 51 is disposed in a substantially middle position of the annular terminal spring 13 in the axial direction of the annular terminal spring 13.

In the connector 1A according to the another embodiment, as shown in FIG. 8B, when the terminal 10A and the mating terminal 60 are connected to each other, even if the pressing plate portion 61 of the mating terminal 60 comes excessively close to the conductive main body 11, the flat surface portion 63 of the pressing plate portion 61 abuts against the restricting protrusion 51 of the fastener 15A, and the predetermined gap is defined between the flat surface portion 63 of the mating terminal 60 and the abutment surface 23 of the terminal 10A. As a result, excessive deformation of the annular terminal spring 13 can be prevented, and connection reliability between the terminal 10 and the mating terminal 60 via the annular terminal spring 13 can be maintained.

Figure 9:
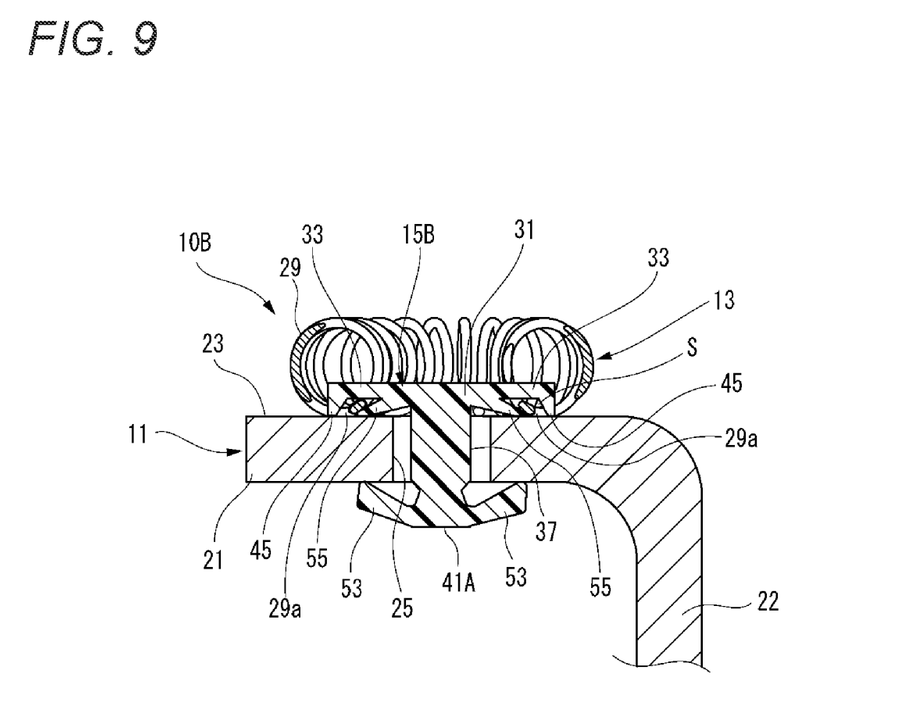
FIG. 9 is a cross-sectional view taken along an axial direction of a terminal according to a yet another embodiment of the present invention.

FIG. 9 is a cross-sectional view taken along an axial direction of a terminal OB according to a yet another embodiment of the present invention. As shown in FIG. 9, in the terminal 10B according to the yet another embodiment, a fastener 15B including a locking portion 41A having a flexible locking piece 53 is used. The flexible locking piece 53 of the fastener 15B is inclined such that the flexible locking piece 53 protrude toward a rear side in the insertion direction of the fastener 15B into the through hole 25. The fastener 15B has an elastic piece 55. The elastic piece 55 extends outward in the radial direction of the main body shaft 31 from the main body shaft 31 and is inclined toward the abutment surface 23 of the conductive main body 11.

In the terminal 10B of the yet another embodiment, when the fixed shaft portion 37 of the fastener 15B is inserted into the through hole 25 of the connection plate portion 21 of the conductive main body 11, the flexible locking piece 53 of the locking portion 41A is locked to an edge portion of the through hole 25 on a surface of the connection plate portion 21 opposite to the abutment surface 23. At this time, the elastic piece 55 is pressed by the abutment surface 23 and elastically deformed. Accordingly, the annular terminal spring 13 can be elastically held by the flexible locking piece 53 of the locking portion 41A without giving flexibility to the arm portions 33.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a terminal (10, 10A, 10B) is configured to be connected to a mating terminal (60) having a flat surface portion (63). The terminal (10, 10A, 10B) includes a conductive main body (11) having an abutment surface (23) configured to face the flat surface portion (63), an annular terminal spring (13) in which a spring having conductivity is bent and both ends of the spring are joined to each other such that the spring has an annular shape, the annular terminal spring (13) being held on the abutment surface (23) and a fastener (15) holding the annular terminal spring (13) on the abutment surface (23). The fastener (15) includes a main body shaft (31) being inserted into a central space (CS) of the annular terminal spring (13), a first end of the main body shaft (31) being fixed to the conductive main body (11), and a plurality of arm portions (33) extending outward in a radial direction of the fastener (15) from a second end of the main body shaft (31), the second end being opposite to the first end, the plurality of arm portions (33) being configured to hold the annular terminal spring (13) at a contacting portion (29a) of the annular terminal spring (13), the contacting portion (29a) contacting the abutment surface (23).

According to the terminal having the above configuration, the contacting portion of the annular terminal spring contacting the abutment surface is held by the plurality of arm portions of the fastener fixed to the conductive main body. That is, when the annular terminal spring is compressed by the mating terminal, the main body shaft, in which the plurality of arm portions holding the contacting portion contacting the abutment surface of the annular terminal spring extend outward in the radial direction from the rear end portion of the main body shaft, does not protrude from the central space (inner peripheral portion) of the annular terminal spring. Therefore, when the terminal and the mating terminal are brought close to each other to be connected to each other, only the annular terminal spring can be brought into contact with the flat surface portion of the mating terminal. As a result, compared to a structure in the related art in which the holding shaft portion holding the annular terminal spring at the time of connection is inserted into the escape hole of the mating terminal, with the present embodiment, it is unnecessary to perform machining of the escape hole, and displacement of the terminal and the mating terminal in the direction intersecting the connecting direction of the terminal and the mating terminal can be allowed.

Therefore, the terminal with such a configuration can be easily connected to the mating terminal to obtain high connection reliability while reducing the cost.

The plurality of arm portions (33) may have flexibility and may be configured to hold the annular terminal spring (13) while being bent.

With this configuration, the arm portion having flexibility of the fastener can hold the contacting portion of the annular terminal spring while being bent. Therefore, the annular terminal spring can be satisfactorily held without rattling.

The main body shaft (31) may have a step portion (39) configured such that, when the step portion (39) contacts the abutment surface (23), a space (S) is defined between the plurality of arm portions (33) and the abutment surface (23).

With this configuration, the contacting portions of the ring portion of the annular terminal spring contacting the abutment surface are passed through the space defined by the step portion between the arm portions and the abutment surface. Therefore, when the annular terminal spring is compressed at the time of connection between the terminal and the mating terminal, the portions of the contacting portions of the annular terminal spring which are held by the arm portions are not unmovably fixed but can move. Therefore, when the annular terminal spring is compressed, the ring portion can easily lie down. As a result, the annular terminal spring can be brought into uniform contact with the flat surface portion of the mating terminal in the circumferential direction of the annular terminal spring, and a good conduction state can be obtained.

Each of the plurality of arm portions (33) may have a locking protrusion (45) protruding toward the abutment surface (23).

With this configuration, the movement of the contacting portion of the annular terminal spring held by the arm portions along the abutment surface can be limited by the locking protrusion, and the annular terminal spring can be held more favorably.

A restricting protrusion (51) may be provided on the second end of the main body shaft (31), the restricting protrusion (51) being configured such that, when the restricting protrusion (51) contacts the flat surface portion (63), a predetermined gap is defined between the flat surface portion (63) and the abutment surface (23).

With this configuration, even if the terminal and the mating terminal are brought excessively close to each other, the flat surface portion abuts against the restricting protrusion of the fastener, and a predetermined gap is defined between the flat surface portion of the mating terminal and the abutment surface of the terminal. As a result, excessive deformation of the annular terminal spring can be prevented, and connection reliability with the mating terminal via the annular terminal spring can be maintained.

According to another aspect of the embodiments described above, a connector (1, 1A) includes a mating terminal (60) having a flat surface portion (63) and the terminal (10, 10A, 10B). The mating terminal (60) and the terminal (10, 10A, 10B) are configured to electrically connected to each other with the annular terminal spring (13) being compressed along an insertion direction in which the main body shaft (31) is inserted into the central space (CS) of the annular terminal spring (13) by the conductive main body (11) and the mating terminal (60).

According to the connector having the above configuration, the annular terminal spring is compressed by the flat surface portion of the mating terminal and the abutment surface of the terminal, so that the terminal and the mating terminal can be electrically connected while easily absorbing the tolerance occurred in the connecting direction of the terminal and the mating terminal and the direction intersecting the connecting direction.

What is claimed is:

1. A terminal configured to be connected to a mating terminal having a flat surface portion, the terminal comprising:
   a conductive main body having an abutment surface configured to face the flat surface portion;
   an annular terminal spring in which a spring having conductivity is bent and both ends of the spring are joined to each other such that the spring has an annular shape, the annular terminal spring being held on the abutment surface; and
   a fastener holding the annular terminal spring on the abutment surface,
   wherein the fastener includes:
   a main body shaft being inserted into a central space of the annular terminal spring, a first end of the main body shaft being fixed to the conductive main body, and
   a plurality of arm portions extending outward in a radial direction of the fastener from a second end of the main body shaft, the second end being opposite to the first end, the plurality of arm portions being configured to hold the annular terminal spring at a contacting portion of the annular terminal spring, the contacting portion contacting the abutment surface.

2. The terminal according to claim 1,
wherein the plurality of arm portions have flexibility and are configured to hold the annular terminal spring while being bent.

3. The terminal according to claim 1,
wherein the main body shaft has a step portion configured such that, when the step portion contacts the abutment surface, a space is defined between the plurality of arm portions and the abutment surface.

4. The terminal according to claim 1,
wherein each of the plurality of arm portions has a locking protrusion protruding toward the abutment surface.

5. The terminal according to claim 1,
wherein a restricting protrusion is provided on the second end of the main body shaft, the restricting protrusion being configured such that, when the restricting protrusion contacts the flat surface portion, a predetermined gap is defined between the flat surface portion and the abutment surface.

6. A connector comprising:
a mating terminal having a flat surface portion; and
the terminal according to claim 1,
wherein the mating terminal and the terminal are configured to electrically connected to each other with the annular terminal spring being compressed along an insertion direction in which the main body shaft is inserted into the central space of the annular terminal spring by the conductive main body and the mating terminal.

\* \* \* \* \*